United States Patent
Ko et al.

(10) Patent No.: US 11,814,002 B2
(45) Date of Patent: Nov. 14, 2023

(54) DOOR-MOUNTED AIR BAG AND CONTROL METHOD FOR DEPLOYING SAME

(71) Applicant: HYUNDAI MOBIS CO., LTD., Seoul (KR)

(72) Inventors: Seok Hoon Ko, Yongin-si (KR); Seok Min Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/057,176

(22) Filed: Nov. 18, 2022

(65) Prior Publication Data
US 2023/0202420 A1   Jun. 29, 2023

(30) Foreign Application Priority Data

Dec. 28, 2021 (KR) .................. 10-2021-0190101
Dec. 28, 2021 (KR) .................. 10-2021-0190102

(51) Int. Cl.
*B60R 21/21* (2011.01)
*B60R 21/01* (2006.01)

(52) U.S. Cl.
CPC .............. *B60R 21/21* (2013.01); *B60R 21/01* (2013.01)

(58) Field of Classification Search
CPC .................................................. B60R 21/21
See application file for complete search history.

(56) References Cited

U.S. PATENT DOCUMENTS

| | | | |
|---|---|---|---|
| 5,732,785 A * | 3/1998 | Ran .................. | B60R 19/205 180/274 |
| 8,731,815 B2 * | 5/2014 | Cummings ....... | B60W 30/0953 701/301 |
| 11,472,360 B2 * | 10/2022 | Tejeda ............... | G07C 5/0825 |
| 2002/0093180 A1 * | 7/2002 | Breed ................ | G01S 15/88 280/730.1 |
| 2005/0057350 A1 * | 3/2005 | Younse ............. | B60R 99/00 340/457.1 |
| 2007/0057491 A1 * | 3/2007 | Bayley .............. | B60R 21/21 280/730.2 |
| 2017/0210329 A1 * | 7/2017 | Rao .................. | B60N 2/75 |
| 2020/0172041 A1 * | 6/2020 | Dix ................... | B60R 21/235 |

(Continued)

FOREIGN PATENT DOCUMENTS

| | | | | |
|---|---|---|---|---|
| CN | 113246899 A | * | 8/2021 | |
| DE | 102005012719 A1 | * | 9/2006 | ....... B60R 21/0134 |

(Continued)

OTHER PUBLICATIONS

English Language Abstract of KR 10-0526147 published Nov. 3, 2005.

*Primary Examiner* — Nicole T Verley
(74) *Attorney, Agent, or Firm* — DLA PIPER LLP (US)

(57) ABSTRACT

A door-mounted air bag and a control method for deploying the same are proposed. The door-mounted air bag is configured to minimize injuries to a passenger on a two-wheeled vehicle and a passenger in a vehicle when the passenger on the two-wheeled vehicle hits a door, and the door-mounted air bag includes a door-mounted air bag including: an air bag mounted to a door, and a cushion provided in the air bag and configured to be deployed in an inward direction of the door, and configured to be deployed in a form that covers an inner surface of a door trim and an edge of a door rear end.

13 Claims, 9 Drawing Sheets

(56) References Cited

U.S. PATENT DOCUMENTS

| | | | |
|---|---|---|---|
| 2020/0269796 A1* | 8/2020 | Schnur | B60R 21/21 |
| 2022/0324405 A1* | 10/2022 | Abramczyk | B60R 21/01554 |
| 2022/0348162 A1* | 11/2022 | Lee | B60R 21/0134 |
| 2023/0129212 A1* | 4/2023 | Kim | B60R 21/206 |
| | | | 280/730.1 |

FOREIGN PATENT DOCUMENTS

| | | | | |
|---|---|---|---|---|
| DE | 102007001781 A1 * | 7/2008 | | B60R 21/21 |
| DE | 102013007425 B4 * | 11/2020 | | B60R 19/205 |
| EP | 0411979 A2 * | 2/1991 | | |
| EP | 0523704 A1 * | 1/1993 | | |
| JP | 04368250 A * | 12/1992 | | |
| JP | H066124 U * | 1/1994 | | |
| JP | 09150703 A * | 6/1997 | | B60R 21/21 |
| JP | H09150703 A * | 6/1997 | | |
| JP | 2895577 B2 * | 5/1999 | | |
| JP | 2006213318 A * | 8/2006 | | B60R 21/08 |
| KR | 10-0526147 | 11/2005 | | |
| KR | 20220125494 A * | 9/2014 | | |
| KR | 20220150114 A * | 11/2022 | | |
| KR | 20220153264 A * | 11/2022 | | |
| WO | WO-9800316 A1 * | 1/1998 | | B60J 5/06 |
| WO | WO-2015090582 A1 * | 6/2015 | | B60R 21/21 |

* cited by examiner

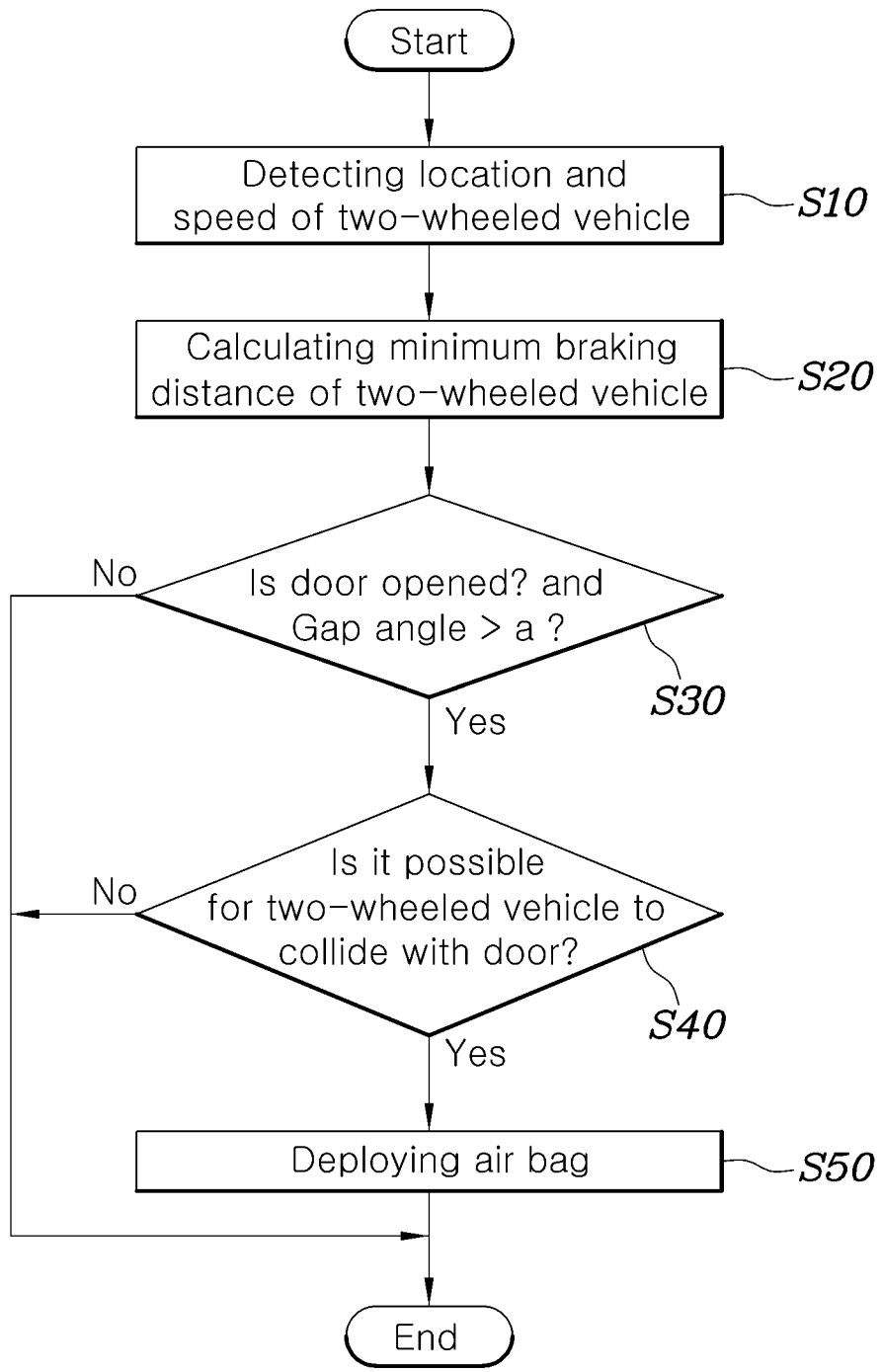

DOOR-MOUNTED AIR BAG AND CONTROL METHOD FOR DEPLOYING SAME

CROSS REFERENCE TO RELATED APPLICATION

The present application claims the benefit of priority to Korean Patent Application No. 10-2021-0190101, filed on Dec. 28, 2021, and to Korean Patent Application No. 10-2021-0190102, filed on Dec. 28, 2021, the entire contents of which is incorporated herein for all purposes by this reference.

BACKGROUND OF THE INVENTION

Field of the Invention

The present invention relates to a door-mounted air bag and a control method for deploying the same, wherein the door-mounted air bag is capable of minimizing injuries to a passenger on a two-wheeled vehicle and a passenger in a vehicle when the passenger on the two-wheeled vehicle hits a door of the vehicle.

Description of the Related Art

When a two-wheeled vehicle, such as a bicycle, quickly approaches a vehicle from a rear-lateral location of the vehicle when a passenger in the vehicle opens a door of the vehicle after the vehicle is stopped, an accident in which a passenger on the two-wheeled vehicle collides with an edge of the opened door occurs.

7% of accidents between vehicles and two-wheeled vehicles are accidents in which the two-wheeled vehicles collide with doors that open, and 63% of these accidents are moderate or severe injuries (AIS2+).

As described above, the frequency of collisions between a two-wheeled vehicle and an opening door and the degree of injury to the passenger are not low.

Therefore, in order to prevent such colliding accidents, Euro NCAP is planning to evaluate the application of a technique, which is configured to detect the presence of the two-wheeled vehicle approaching from a rear-lateral location of the vehicle when the driver's seat door is opened, and either give an alarm to the driver or momentarily stopping the door from being opened.

However, even when a warning device for the two-wheeled vehicle approaching from the rear-lateral location is mounted to the vehicle, a collision between the two-wheeled vehicle and the door of the vehicle may occur in the following cases.

First, a collision may occur when the speed of the two-wheeled vehicle approaching from the rear-lateral location is excessively high or when a driver opens the door rapidly with strong force.

Furthermore, a collision may also occur even when the driver ignores the vehicle's warning or the door stopping, or when sensing of the two-wheeled vehicle approaching from the rear-lateral location is delayed due to a rear obstacle.

The foregoing is intended merely to aid in the understanding of the background of the present invention, and is not intended to mean that the present invention falls within the purview of the related art that is already known to those skilled in the art.

SUMMARY OF THE INVENTION

The present invention has been made keeping in mind the above problems occurring in the related art, and the present invention is intended to provide a door-mounted air bag and a control method for deploying the same, which are configured to minimize injuries to a passenger on a two-wheeled vehicle and a passenger in a vehicle when the passenger on the two-wheeled vehicle hits a door of the vehicle.

In order to achieve the above objective, according to one aspect of the present invention, there is provided a door-mounted air bag including: an air bag mounted to a door; and a cushion provided in the air bag and configured to be deployed in an inward direction of the door, and configured to be deployed in a form that may cover an inner surface of a door trim and an edge of a door rear end.

A trim deployment region deployed at the inner surface of the door trim may be configured to be deployed in preference to an edge deployment region deployed at the edge of the door rear end.

The edge deployment region deployed at the edge of the door rear end may be configured to be deployed equal to or longer than a vertical length of the edge of the door rear end.

The edge deployment region deployed at the edge of the door rear end may be configured to be deployed in a form that may be extended rearward from the edge of the door rear end.

The trim deployment region deployed at the inner surface of the door trim may be configured to be deployed at a location corresponding to lower body including pelvis of a passenger sitting in a seat; and the edge deployment region deployed at the edge of the door rear end may be configured to be deployed at a location corresponding to upper body of the passenger sitting in the seat.

The door-mounted air bag may include: a door panel provided in the door, and to which the air bag may be mounted; and the door trim assembled to the door in a form that may cover the door panel, and having a matching hole matching with an exterior shape of the air bag to allow the air bag to match with and be inserted into the matching hole.

The cushion of the air bag may be stored inside a housing and be covered with a cover in which a tear line may be formed; and the cover may be provided in a direction toward the door trim, and thus the cushion may be deployed in the inward direction of the door through the tear line.

The cover may match with an inside space of the matching hole.

The door panel and a housing may be mounted to each other with a mounting bracket as a medium, and the housing may be coupled to the mounting bracket together with an inflator.

The cushion may be configured to be deployed in a form that may be bent from the edge of the door rear end toward an outside space of the door.

The door-mounted air bag may include: an external sensor configured to detect an object approaching a vehicle from a rear-lateral location of the vehicle; a door sensor configured to detect an opening state of the door; and a controller, when the door is opened, the controller determining collision probability between the object and the door on the basis of a value detected by the external sensor and the door sensor, and when it is determined that the collision probability is high, the controller controlling the cushion so that the cushion is deployed.

The controller may include: a braking distance calculation part configured to calculate a minimum braking distance of the object by using a speed of the object approaching the vehicle and a distance to the door; a gap angle calculation part configured to calculate whether the door may be opened and to calculate a gap angle; and a deployment signal output part, when the object enters within the minimum braking distance and the gap angle of the door exceeds a predetermined angle, the deployment signal output part applying a deployment signal so that the cushion is deployed.

A control method for deploying a door-mounted air bag may include: determining, by a controller, when a door is opened, collision probability between an object, which approaches from a rear-lateral location of a vehicle, and the door, and when it is determined that the collision probability is high, controlling, by the controller, the cushion so that the cushion may be deployed.

The control method may include: calculating a braking distance, calculating a minimum braking distance of the object by using a speed of the object approaching the vehicle and a distance to the door; calculating a gap angle, calculating whether the door may be opened and the gap angle; and outputting a deployment signal, when the object enters within the minimum braking distance and the gap angle of the door exceeds a predetermined angle, applying the deployment signal so that the cushion may be deployment.

As described above, the door-mounted air bag according to the present invention has the following effect. When the two-wheeled vehicle collides with the door, the passenger on the two-wheeled vehicle is prevented from directly hitting the door and hits the cushion, so that a risk of injuries to the passenger on the two-wheeled vehicle and the passenger of the vehicle due to a collision with the door can be minimized and both the passenger on the two-wheeled vehicle and the passenger in the vehicle can be safely protected.

BRIEF DESCRIPTION OF THE DRAWINGS

FIG. 11 is a flowchart overall showing a control method for deploying the cushion according to the present invention.

DETAILED DESCRIPTION OF THE INVENTION

Figure 1:
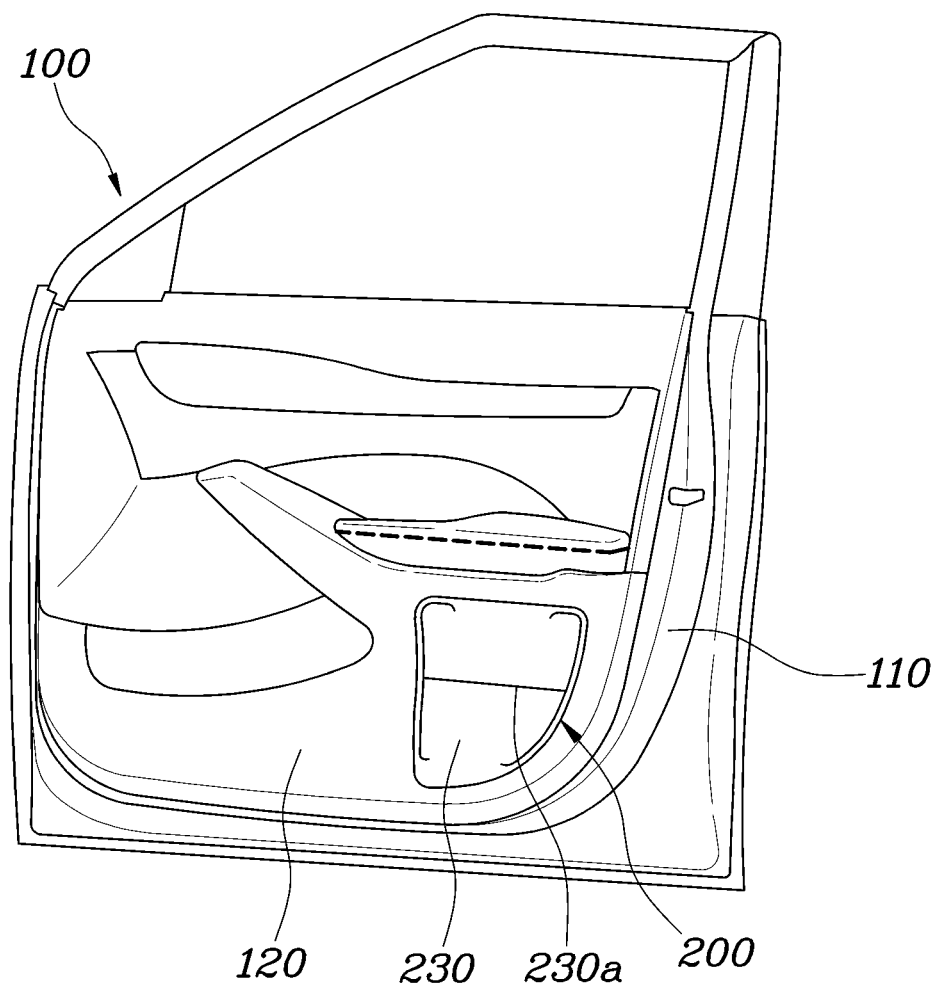
FIG. 1 is a view showing an air bag mounted to a door according to the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment of the present invention will be described in detail with reference to accompanying drawings.

Figure 2:
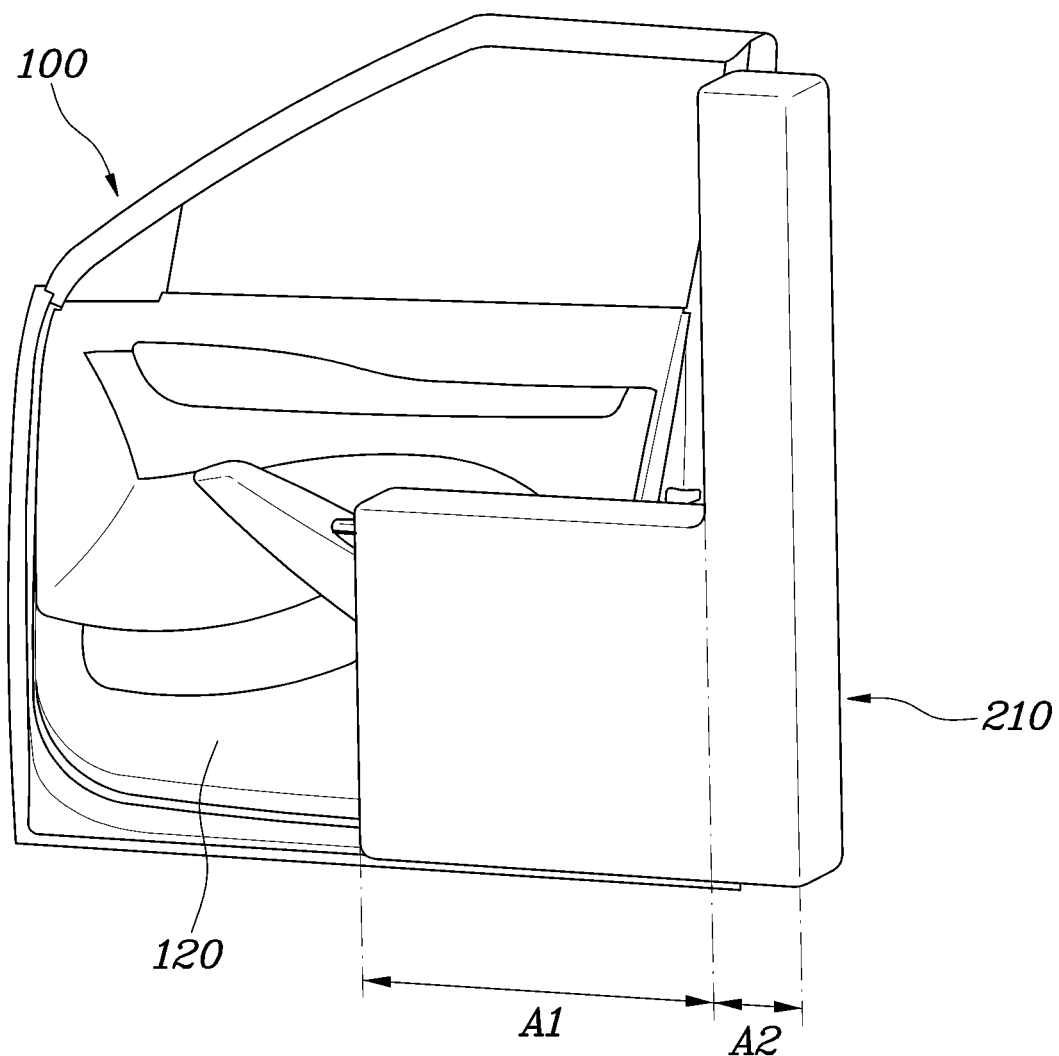
FIG. 2 is a view showing a deployed form of a cushion in FIG. 1.

FIG. 1 is a view showing an air bag 200 mounted to a door 100 according to the present invention. FIG. 2 is a view showing a deployed form of a cushion 210 in FIG. 1.

Referring to the drawings, the door-mounted air bag 200 of the present invention includes: the air bag 200 mounted to the door 100; and the cushion 210 provided in the air bag 200 and deployed in an inward direction of the door 100, and deployed in a form that covers an inner surface of a door trim 120 and an edge of a rear end of the door 100.

For example, the cushion 210 is installed to be deployed inward from the door 100.

Specifically, as the cushion 210 is deployed inward from the door 100, the cushion 210 is deployed in the form that covers a part of or all the door trim 120, and deployed toward the rear end of the door 100 and deployed in the form that covers the end of the rear end of the door 100.

In other words, when a two-wheeled vehicle is approaching quickly from a rear-lateral location of the vehicle while a vehicle stops and the door 100 is opened, the cushion 210 is deployed to cover the opened edge portion of the rear end of the door 100.

Therefore, when the two-wheeled vehicle collides with the door 100, a passenger on the two-wheeled vehicle is prevented from directly colliding with the door 100, and collides with the cushion 210 deployed at the edge of the door 100. Therefore, a risk of injuries to the passenger on the two-wheeled vehicle when the two-wheeled vehicle collides with the door 100 is reduced, and the cushion 210 is deployed at the inner surface of the door 100 so as to protect a passenger who opens the door 100 from a crash with the passenger on the two-wheeled vehicle.

In addition, the air bag of the present invention has a structure in which a trim deployment region A1 deployed at the inner surface of the door trim 120 is deployed in preference to an edge deployment region A2 deployed at the edge of the rear end of the door 100.

Specifically, the entire deployed region of the cushion 210 is roughly divided into the trim deployment region A1 and the edge deployment region A2.

As described above, the trim deployment region A1 and the edge deployment region A2 are divided from each other in response to a deployed region. A boundary between the trim deployment region A1 and the edge deployment region A2 may be formed to be physically separated from each other, but the boundary between the trim deployment region A1 and the edge deployment region A2 may be formed to completely communicate with each other, so that the cushion 210 is rapidly deployed.

In addition, the cushion 210 includes an inflator 240 to supply gas thereinto. The inflator 240 generates gas by receiving a signal of a controller 500, which will be describe below, and generated gas is supplied into the cushion 210.

Specifically, the inflator 240 is connected to the trim deployment region A1, so that the generated from the inflator 240 is supplied into the trim deployment region A1 and thus the trim deployment region A1 is deployed. Then, the gas filled into the trim deployment region A1 is supplied into the edge deployment region A2, so that the trim deployment region A1 may be deployed in preference to the edge deployment region A2.

In addition, in the present invention, the edge deployment region A2 deployed at the edge of the rear end of the door 100 may be deployed equal to or longer than the vertical length of the edge of the rear end of the door 100.

In other words, the edge deployment region A2 of the cushion 210 serves to prevent the passenger on the two-wheeled vehicle from directly hitting the door 100. The edge deployment region A2 is deployed by at least an area that completely cover the edge of the door 100, so that the passenger on the two-wheeled vehicle is more safely protected.

Figure 3:
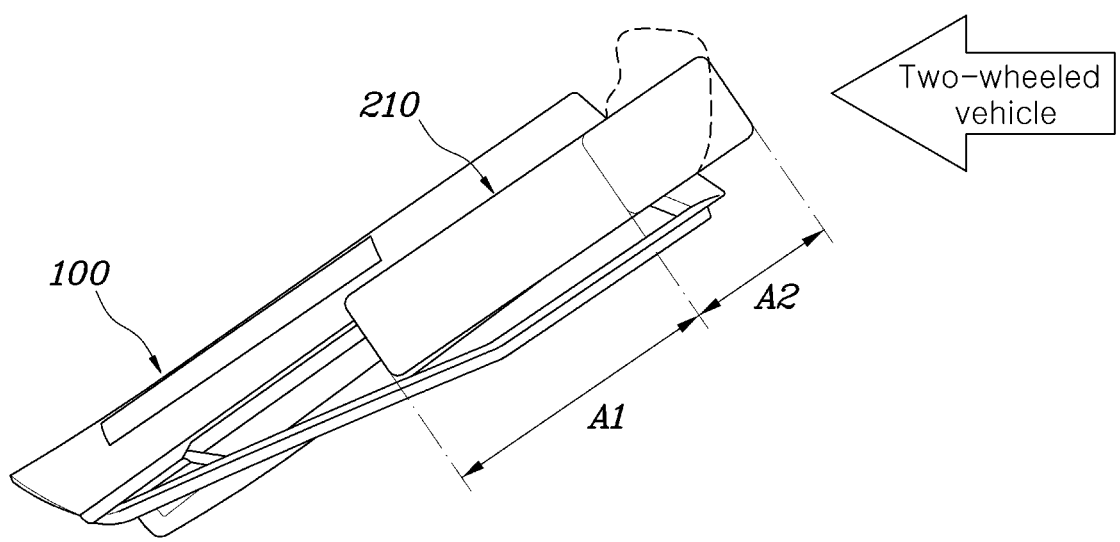
FIG. 3 is a plan view showing the deployed cushion in FIG. 2.

FIG. 3 is a plan view showing the deployed cushion 210 in FIG. 2.

As shown in the drawing, according to the present invention, the edge deployment region A2 deployed at the end of the rear end of the door 100 may be deployed in a form that is extended rearward from the edge of the rear end of the door 100.

In other words, not only the edge deployment region A2 is deployed such that the vertical length thereof is longer than the length of the edge of the door 100, but also when the cushion 210 is viewed from the top, the longitudinal length of the edge deployment region A2 is extended over the door rear end edge to protect the passenger of the two-wheeled vehicle.

As described above, since a rear end of the edge deployment region A2 is formed longer than the rear end of the door 100, when the passenger on the two-wheeled vehicle collides with the door 100, a rearward-extended portion of the edge deployment region A2 is bent in a colliding direction of the passenger on the two-wheeled vehicle and thus it is possible to securely prevent the passenger on the two-wheeled vehicle from directly colliding with the door 100.

Figure 4:
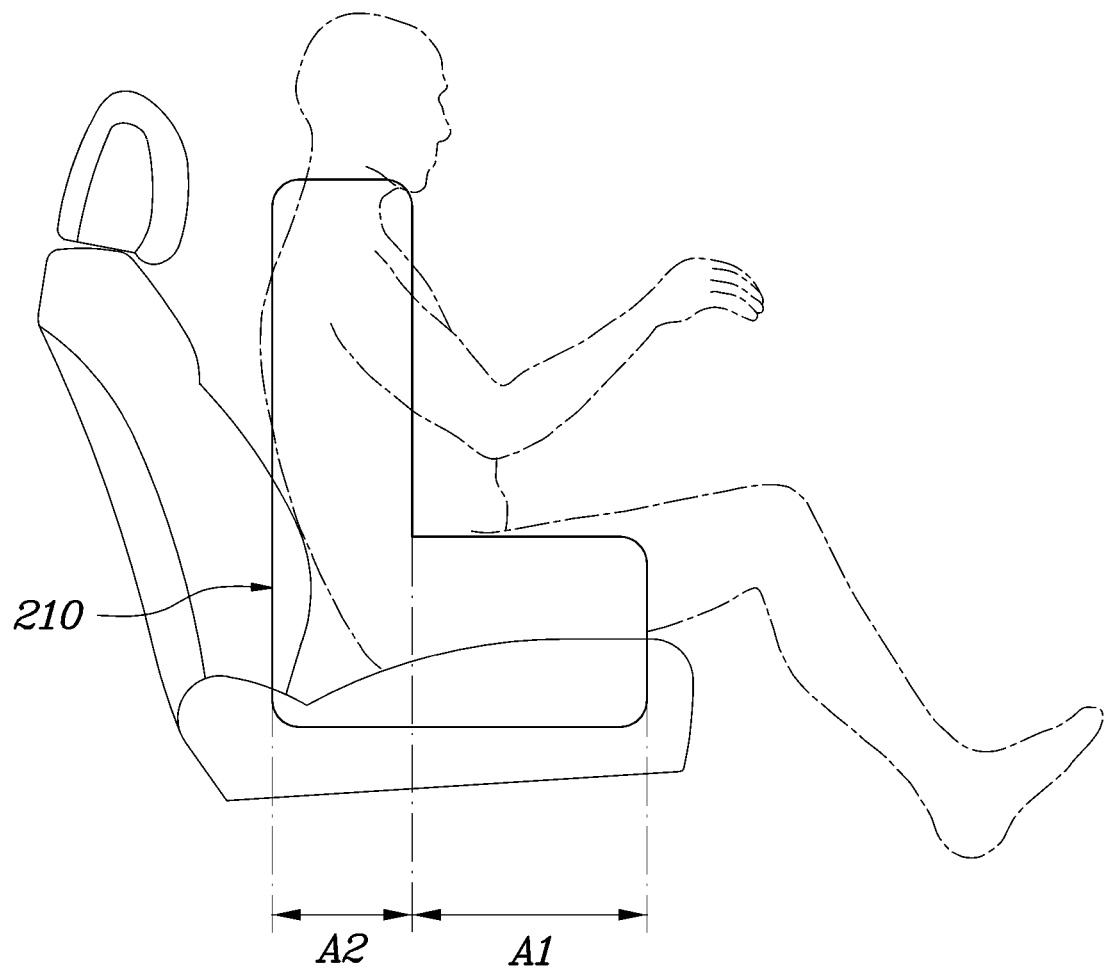
FIG. 4 is a view showing the cushion according to the present invention deployed in an event of a side collision.
Figure 5:
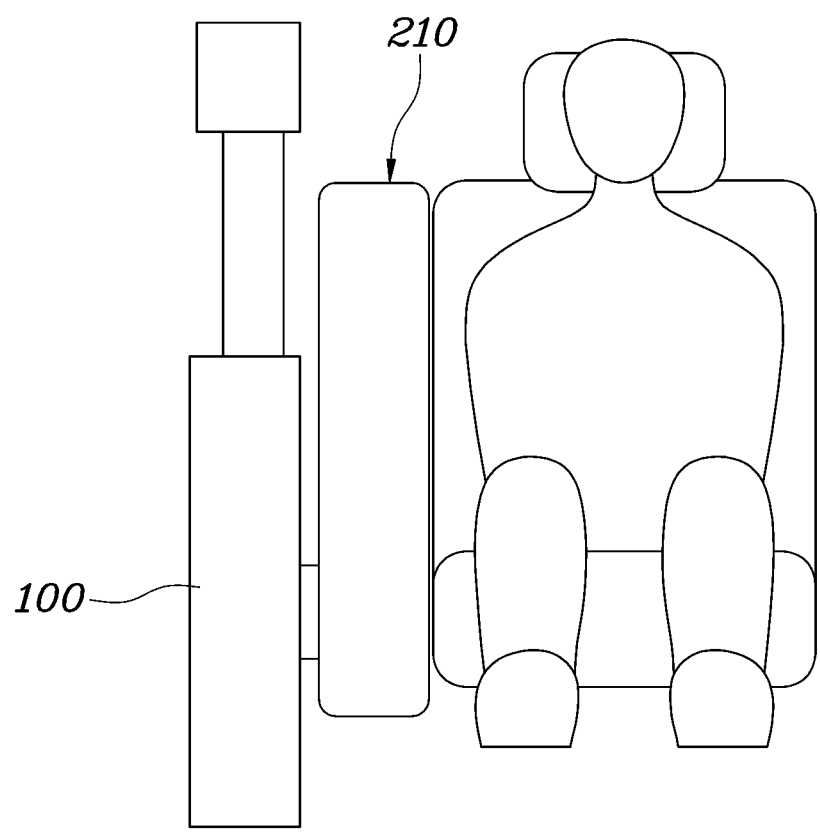
FIG. 5 is a front view showing the cushion in FIG. 4.

FIG. 4 is a view showing the cushion 210 according to the present invention deployed in an event of a side collision. FIG. 5 is a front view showing the cushion 210 in FIG. 4.

Referring to the drawings, according to the present invention the trim deployment region A1 deployed at the inner surface of the door trim 120 may be deployed at a location corresponding the lower body including the pelvis of the passenger who sits in a seat; and the edge deployment region A2 deployed at the edge of the rear end of the door 100 may be deployed at a location corresponding to the upper body of the passenger in the seat.

In other words, the cushion 210 of the present invention may be configured to be deployed when an object approaching from the rear-lateral location of the vehicle is detected and the door 100 is opened, but may be configured to be also deployed when the door 100 is closed and a side collision occurs.

For example, in an event of a side collision of the vehicle, the cushion 210 deployed from the door 100 is deployed between the door and the passenger, thus being deployed such that the trim deployment region A1 is located between the door 100 and the pelvis of the passenger, so that the lower body of the passenger is protected.

In addition, the edge deployment region A2 is deployed between the upper body of the passenger and a B pillar trim so as to protect the upper body of the passenger. Therefore, in the event of side collision, the passenger can be safely protected, and specifically, the cushion 210 protects the upper body of the passenger, thereby replacing a function of an existing side air bag.

Figure 6:
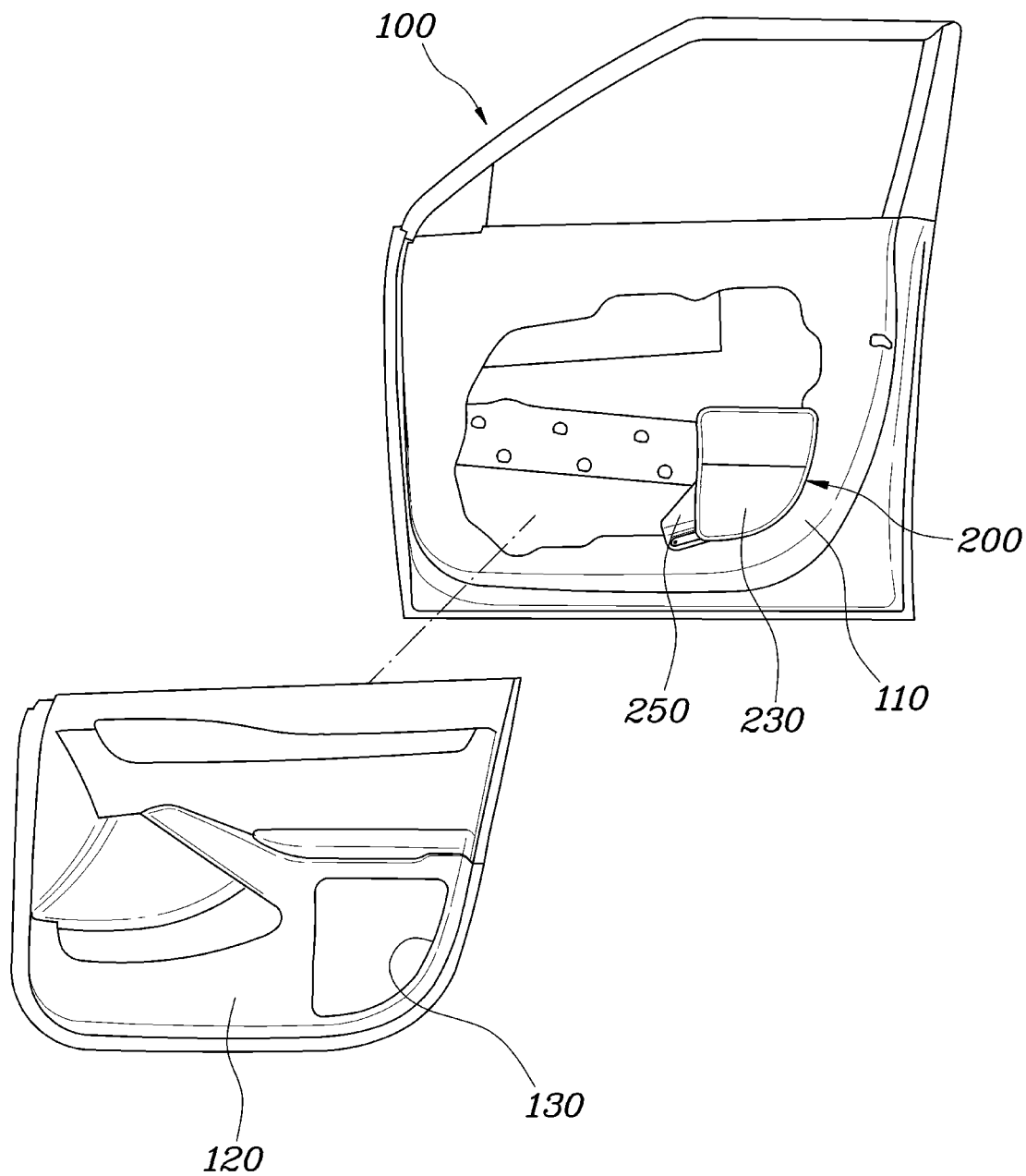
FIG. 6 is a view showing a door trim extracted from FIG. 1.

FIG. 6 is a view showing the door trim extracted from FIG. 1.

Referring to the drawing, the door includes: a door panel 110 provided in the door 100 and mounted to the air bag 200; and the door trim 120 assembled to the door 100 in a form that covers the door panel 110, having a matching hole 130 that matches the exterior of the air bag 200 to allow the air bag 200 to match with and be inserted into the matching hole 130.

Specifically, the air bag 200 is mounted to a lower end of the door panel 110.

In addition, the door trim 120 is assembled in an in-vehicle direction based on the door panel 110.

Specifically, the matching hole 130 is formed in a lower end of the door trim 120 to correspond to the exterior shape of the air bag 200 mounted to the door panel 110.

In addition, as the air bag 200 matches with and is inserted into the matching hole 130, the air bag 200 is shaped to be exposed outside of the door trim 120, i.e., to the inside space of the vehicle room through the matching hole 130.

Therefore, as the cushion 210 is deployed at the inner surface of the door 100, the passenger opening the door 100 is protected from a collision with the passenger on the two-wheeled vehicle.

Figure 7:
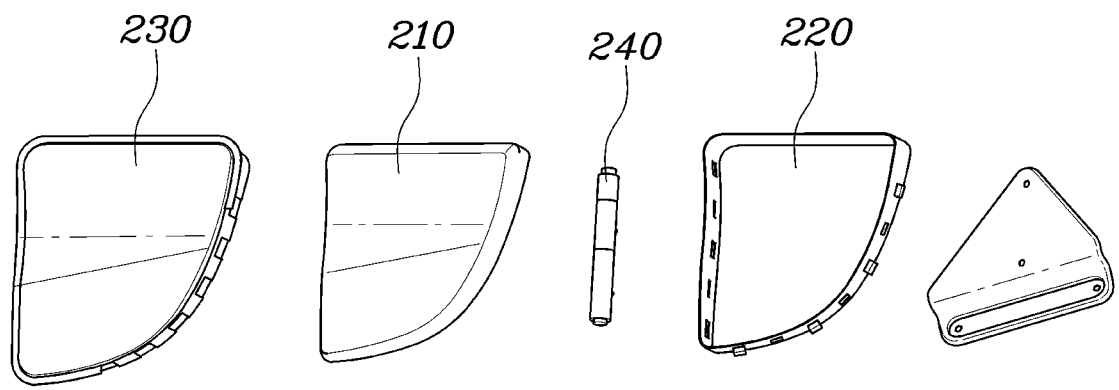
FIG. 7 is an exploded view showing the air bag according to the present invention.

Meanwhile, FIG. 7 is an exploded view showing the air bag 200 according to the present invention.

Referring to the drawing, the present invention is configured such that the cushion 210 is stored in a housing 220 and is covered with a cover 230 having a tear line 230a; and the cover 230 is provided in a direction toward the door trim 120 so that the cushion 210 is deployed in the inward direction of the door 100 through the tear line 230a.

Specifically, the air bag 200 includes the cover 230, the cushion 210, the inflator 240, and the housing 220.

Therefore, the cushion 210 in a folded state is stored between the cover 230 and the housing 220 and the cover 230 and the housing 220 is coupled to each other, and the housing 220 is mounted to the door panel 110 provided inside the door trim 120 so that the air bag 200 is mounted to the door 100.

In addition, the inflator 240 is connected to a gas injection hole (not show) of the cushion 210 and gas generated from the inflator 240 is supplied to the cushion 210.

Specifically, as the cover 230 is mounted to face the inside space of the door 100 and the tear line 230a is formed in the cover 230, the cushion 210 is deployed toward the inside space of the door 100, i.e., toward the vehicle room, while breaking the tear line 230a.

In addition, as shown in FIG. 1, the cover 230 matches with the inside space of the matching hole 130.

In other words, the matching hole 130 is formed in the door trim 120, and when the door trim 120 is coupled to the door panel 110, the exterior shape of the air bag 200 is exposed through the matching hole 130.

Specifically, in order to deploy the cushion 210 toward the inside space of the vehicle room, the cushion 210 should be deployed by tearing the tear line 230a formed in the cover 230. Therefore, the cover 230 is configured to be assembled such that not only the exterior thereof matches with the matching hole 130, bus also the outside surface of the outer the cover 230 exposed outside of the door trim 120 matches with the matching hole 130.

Figure 8:
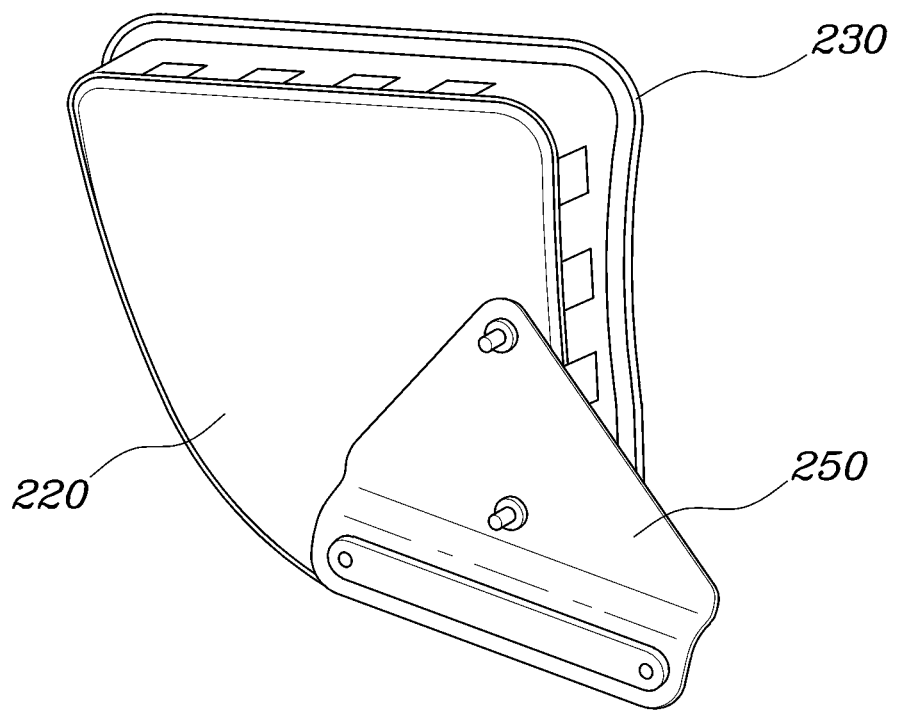
FIG. 8 is a view showing a mounting bracket mounted to a housing of the air bag according to the present invention.

FIG. 8 is a view showing a mounting bracket 250 mounted to the housing 220 of the air bag 200 according to the present invention.

Referring to FIGS. 6 to 8, the door panel 110 and the housing 220 are mounted to each other with the mounting bracket 250 as a medium, and the housing 220 is coupled to the mounting bracket 250 with the inflator 240.

For example, a lower end of the mounting bracket 250 is fixed to at the door panel 110 at 1 spot or more by hardware-coupling such as bolting.

Then, an upper end of the mounting bracket 250 may be coupled to the housing 220 with a stud fixing the inflator 240, or be mounted to the housing 220 by welding, etc.

Figure 9:
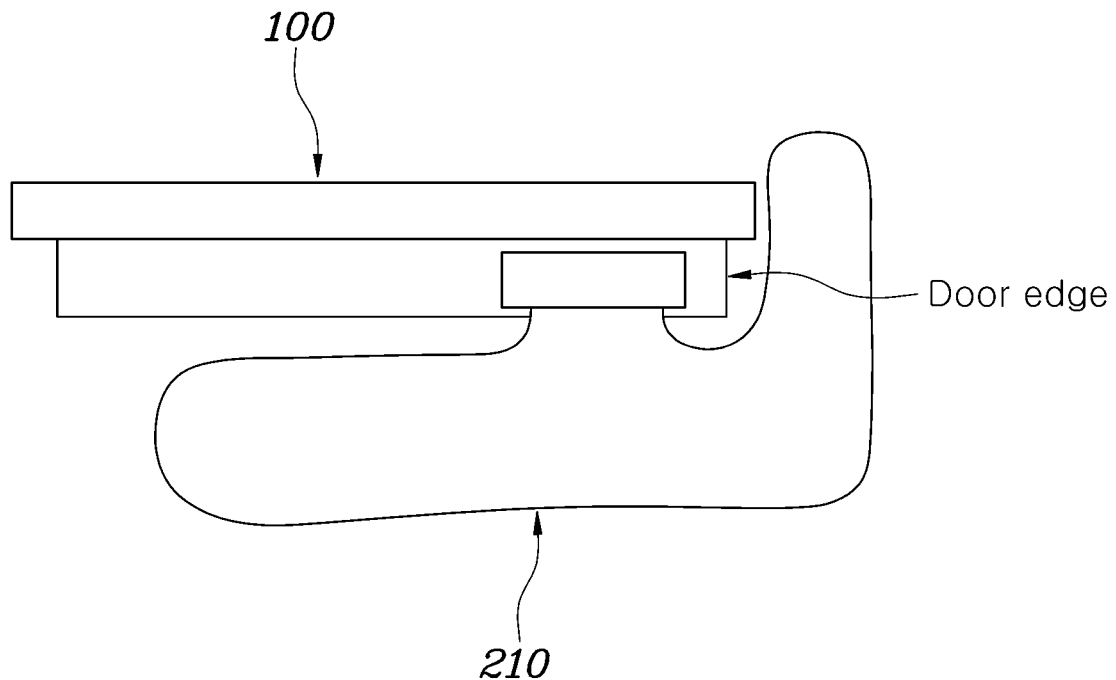
FIG. 9 is a plan view showing the cushion in FIG. 1.

Meanwhile, FIG. 9 is a plan view showing the cushion 210 in FIG. 1.

Referring to the drawing, the cushion 210 may be deployed in a form that is bent from the edge of the rear end of the door 100 to the outside space of the door 100.

In other words, the portion of the cushion 210 deployed at the edge of the door 100 serves to prevent the passenger on the two-wheeled vehicle from directly hitting the door 100. The edge deployment region A2 is deployed by at least an area that completely cover the edge of the door 100, so that the passenger on the two-wheeled vehicle is more safely protected.

Figure 10:
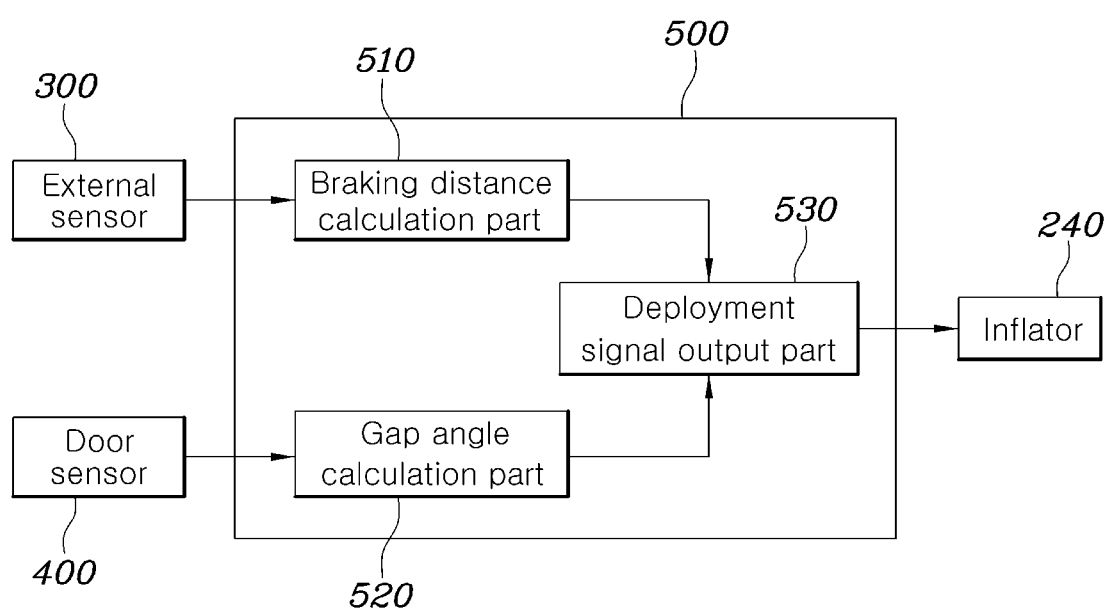
FIG. 10 is a block diagram showing a cushion deployment control system according to the present invention.

Meanwhile, FIG. 10 is a block diagram showing a cushion deployment control system according to the present invention.

Referring to the drawing, the cushion deployment control system includes; an external sensor 300 detecting an object approaching the vehicle from the rear-lateral location of the vehicle; a door sensor 400 detecting an opening state of the door 100; the controller 500, when the door 100 is opened, the controller determining proper collision probability between the object and the door 100 on the basis of a value calculated by the external sensor 300 and the door sensor 400, and when it is determined that the collision probability is high, the controller controlling the cushion 210 so that the cushion 210 is deployed.

For example, the external sensor 300 may be a sensor such as vehicle-mounted cameras or ultrasonic sensors, and detects an object such as the two-wheeled vehicle approaching from the rear-later side of the vehicle and transmit a value thereof to the controller 500.

The door sensor 400 senses whether the door 100 is opened, and transmits an opening signal of the door 100 to the controller 500.

Therefore, when the door 100 is opened, when the collision probability between the two-wheeled vehicle approaching from the rear-lateral location and the door 100 is high, the controller 500 controls the cushion 210 so that the cushion 210 is deployed, the passenger on the two-wheeled vehicle hits the deployed cushion 210.

Therefore, the passenger on the two-wheeled vehicle is prevented from directly hitting the door 100 or hitting the passenger in the vehicle, and thus both the passenger on the two-wheeled vehicle and the passenger in the vehicle are safely protected from a collision accident.

In addition, the controller 500 includes: a braking distance calculation part 510 calculating a minimum braking distance of the object by using a speed of the object approaching the vehicle and a distance to the door 100; a gap angle calculation part 520 determining whether the door 100 is opened and determining a gap angle; and a deployment signal output part 530, when the object enters within the minimum braking distance, and the gap angle of the door 100 exceeds a predetermined angle, applying a deployment signal so that the cushion 210 is deployed.

In other words, a location and a speed of the two-wheeled vehicle are detected using the signal detected by the external sensor 300, and the minimum braking distance of the two-wheeled vehicle is secured using the detected speed of the two-wheeled vehicle and the distance to the door 100.

In addition, whether the door 100 is opened and the gap angle of the door 100 are secured using the signal detected by the door sensor 400.

Then, when the door 100 is opened over the predetermined angle, and when a distance between the two-wheeled vehicle and the door 100 enters within the minimum braking distance and it is determined that the collision probability is high, the controller applies the deployment signal to the inflator 240 to deploy the cushion 210.

For reference, according to the exemplary embodiment of the present invention, the controller 500 may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be realized as separate chips. Alternately, the memory and processor may be realized as an integrated single chip. The processor may have one or more forms.

FIG. 11 is a flowchart overall showing a control method for deploying the cushion 210 according to the present invention.

Referring to the drawing, when the door 100 is opened, the controller 500 determines the collision probability between the object approaching from the rear-lateral location of the vehicle and the door 100, and when it is determined that the collision probability is high, the controller 500 controls the cushion 210 so that the cushion 210 is deployed.

Specifically, a control method for deploying the cushion 210 by using the controller 500 includes; calculating a braking distance, calculating a minimum braking distance of the object by using a speed of the object approaching the vehicle and a distance to the door 100; calculating a gap angle, calculating whether the door 100 is opened and a gap angle; and outputting a deployment signal, when the object enters within the minimum braking distance and the gap angle of the door 100 exceeds the predetermined angle, applying the deployment signal so that the cushion 210 is deployed.

In addition, in describing a control process of deploying the door-mounted air bag 200 with reference to FIG. 11, when the two-wheeled vehicle approaches the vehicle from the rear-lateral location, the external sensor 300 mounted to the vehicle detects a location and a speed of the two-wheeled vehicle at S10.

Then, the detected speed of the two-wheeled vehicle and the detected distance to the door 100 are used to secure a minimum braking distance of the two-wheeled vehicle at S20.

Then, the signal detected by the door sensor 400 is used to secure whether the door 100 is opened and a gap angle of the door 100.

In other words, when the door 100 is opened, it is determined whether a gap angle of the door 100 exceeds a° at S30.

As a result at S30, when the door 100 is opened at a gap angle that exceeds the predetermined angle, it is determined whether the collision probability between the two-wheeled vehicle and the door 100 is high at S40.

In other words, when at a point of timing where the door 100 is opened, a distance between the two-wheeled vehicle and the door 100 enters within the minimum braking distance, it is determined that the collision probability is high.

Then, when the collision probability is high, the deployment signal is applied to the inflator 240 to deploy the cushion 210 at S50.

As described above, according to the present invention, when the two-wheeled vehicle collides with the door 100, the passenger on the two-wheeled vehicle is prevented from directly hitting the door 100 and hits the cushion 210, so that a risk of injuries to the passenger on the two-wheeled vehicle and the passenger of the vehicle due to a collision with the door 100 is minimized and both the passenger on the two-wheeled vehicle and the passenger in the vehicle are safely protected.

Although the preferred embodiment of the present invention has been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. A door-mounted air bag comprising:
   an air bag mounted to a door; and
   a cushion provided in the air bag and configured to be deployed:
   in an inward direction of the door,
   in a form that covers an inner surface of a door trim and an edge of a door rear end, and
   in a form that is bent from the edge of the door rear end toward an outside space of the door.

2. The door-mounted air bag of claim 1, wherein the cushion comprises a trim deployment region deployed at the inner surface of the door trim and an edge deployment region deployed at the edge of the door rear end, wherein the trim deployment region is configured to be deployed in preference to the edge deployment region.

3. The door-mounted air bag of claim 1, wherein the cushion comprises an edge deployment region deployed at the edge of the door rear end, wherein the edge deployment region is configured to be deployed equal to or longer than a vertical length of the edge of the door rear end.

4. The door-mounted air bag of claim 1, wherein the cushion comprises an edge deployment region deployed at the edge of the door rear end, wherein the edge deployment region is configured to be deployed in a form that is extended rearward from the edge of the door rear end.

5. The door-mounted air bag of claim 1, wherein the cushion comprises a trim deployment region deployed at the inner surface of the door trim, wherein the trim deployment region is configured to be deployed at a location corresponding to lower body including pelvis of a passenger sitting in a seat; and
   the cushion comprises an edge deployment region deployed at the edge of the door rear end, wherein the edge deployment region is configured to be deployed at a location corresponding to upper body of the passenger sitting in the seat.

6. The door-mounted air bag of claim 1, further comprising:
   a door panel provided in the door, and to which the air bag is mounted; and
   the door trim assembled to the door in a form that covers the door panel, the door trim comprising a matching hole matching with an exterior shape of the air bag to allow the air bag to match with and be inserted into the matching hole.

7. The door-mounted air bag of claim 6, wherein the cushion of the air bag is stored inside a housing and is covered with a cover in which a tear line is formed; and
   the cover is provided in a direction toward the door trim, and thus the cushion is deployed in the inward direction of the door through the tear line.

8. The door-mounted air bag of claim 7, wherein the cover matches with an inside space of the matching hole.

9. The door-mounted air bag of claim 6, wherein the door panel and a housing are mounted to each other with a mounting bracket, and
   the housing is coupled to the mounting bracket together with an inflator.

10. A door-mounted air bag comprising:
    an air bag mounted to a door;
    a cushion provided in the air bac and configured to be deployed in an inward direction of the door, and configured to be deployed in a form that covers an inner surface of a door trim and an edge of a door rear end;
    an external sensor configured to detect an object approaching a vehicle from a rear-lateral location of the vehicle;
    a door sensor configured to detect an opening state of the door; and
    a controller configured so that, when the door is opened, the controller determines collision probability between the object and the door on the basis of a value detected by the external sensor and the door sensor, and in response to determining that the collision probability is high, the controller is configured to control the cushion so that the cushion is deployed.

11. The door-mounted air bag of claim 10, wherein the controller is configured to:
calculate a minimum braking distance of the object by using a speed of the object approaching the vehicle and a distance to the door;
calculate whether the door is opened and to calculate a gap angle; and
in response to the object entering within the minimum braking distance and the gap angle of the door exceeds a predetermined angle, apply a deployment signal so that the cushion is deployed.

12. A control method for deploying a door-mounted air bag, the air bac comprising:
an air bag mounted to a door; and
a cushion provided in the air bac and configured to be deployed in an inward direction of the door, and configured to be deployed in a form that covers an inner surface of a door trim and an edge of a door rear end, the control method comprising:
determining, by a controller, that a door is opened;
determining, by the controller, a collision probability between an object, which approaches from a rear-lateral location of a vehicle, and the door; and
in response to determining that the collision probability is high, controlling, by the controller, the cushion so that the cushion is deployed.

13. The control method of claim 12, further comprising:
calculating, by the controller, a minimum braking distance of the object by using a speed of the object approaching the vehicle and a distance to the door;
calculating, by the controller, whether the door is opened and a gap angle; and
in response to the object entering within the minimum braking distance and the gap angle of the door exceeding a predetermined angle, applying, by the controller, a deployment signal so that the cushion is deployment.

\* \* \* \* \*